(12) United States Patent
Chen

(10) Patent No.: US 8,444,003 B2
(45) Date of Patent: May 21, 2013

(54) ASSEMBLED CONTAINER

(76) Inventor: Robert Chen, Taipei (TW)

( * ) Notice: Subject to any disclaimer, the term of this patent is extended or adjusted under 35 U.S.C. 154(b) by 0 days.

(21) Appl. No.: 13/279,607

(22) Filed: Oct. 24, 2011

(65) Prior Publication Data

US 2012/0131850 A1    May 31, 2012

(30) Foreign Application Priority Data

Nov. 29, 2010 (TW) ................................ 99223083 U

(51) Int. Cl.
*B65D 1/42*    (2006.01)

(52) U.S. Cl.
USPC ........... 220/643; 220/315; 220/640; 220/642; 220/656; 220/657; 220/659; 220/796; 220/801; 220/802; 47/65.5; 47/66.1; 47/75; 119/61.5

(58) Field of Classification Search
USPC ................. 220/315, 640, 642, 643, 656, 657, 220/659, 796, 801, 802; 47/65.5, 66.1, 75; 119/61.5
See application file for complete search history.

*Primary Examiner* — Anthony Stashick
*Assistant Examiner* — Elizabeth Volz
(74) *Attorney, Agent, or Firm* — patenttm.us

(57) ABSTRACT

An assembled container has a body and an upper collar. The body has an open top, an annular lip, an annular wall and multiple combining blocks. The annular wall is formed on and protrudes from the annular lip and has at least one engaging recess. The combining blocks are formed on and protrude from the annular lip and each have a combining hole and at least one engaging hole. The upper collar is connected to the open top of the body and has an annular recess, at least one engaging block and multiple combining inserts. The at least one engaging block is formed in the annular recess and respectively engages the at least one engaging recess. The combining inserts are formed in the annular recess and are respectively inserted into and combined with the combining holes.

9 Claims, 8 Drawing Sheets

ASSEMBLED CONTAINER

BACKGROUND OF THE INVENTION

1. Field of the Invention

The present invention relates to a container, and more particularly to an assembled container having an enhanced combining strength between a body and an upper collar of the container.

2. Description of Related Art

A conventional container, such as a flowerpot may have an upper collar in a curved cross section formed on the open top of the container to improve the appearance of the container. To enhance the structural strength of the open top of the container, the upper collar may have a thickness larger than that of the body of the container. Accordingly, when a user holds the upper collar to transport the container with the containing object inside the container, the thick upper collar can bear the whole weight of the container with the containing object. However, to form a body with a thick collar with an injection molding process is time consuming because the shrinking times for the body and the upper collar of the conventional container are different.

With reference to FIG. 8, a conventional flowerpot comprises a body and an upper collar. The upper collar 30 is mounted on the open top of the body and comprises a collar segment 32 and an annular sheet 31. The collar segment 32 is integrally formed around the open top of the body, and the annular sheet 31 is connected to the collar segment 32 by an engagement manner.

However, the engagement manner between the collar segment 32 and the annular sheet 31 cannot have a large width otherwise easily causes damages of the collar segment 32 and annular sheet 31. Furthermore, the annular sheet 31 is moveable and rotatable relative to the collar segment 32 and is easily detached from the collar segment 32.

With reference to FIGS. 9 and 10, another conventional flowerpot comprises a body and an upper collar 40. The upper collar 40 comprises a skirt 50 and a collar member 60. The skirt 50 is formed on and extends downward from the open top of the body and has multiple supporting tabs 51 formed on and extending downward from a bottom of the skirt 50. An annular engaging groove 52 is defined in the bottom of the skirt 50 and engages the collar member 60 to form as the upper collar 40.

However, the arrangement of the supporting tabs 51 will cause the difficulty and complication of forming the conventional flowerpot, and the defective rate of the conventional flowerpot increases. The collar member 60 of the upper collar 40 of the conventional flowerpot is also rotatable and moveable relative to the skirt 50 and is easily detached from the skirt 50.

To overcome the shortcomings, the present invention tends to provide an assembled container to mitigate or obviate the aforementioned problems.

SUMMARY OF THE INVENTION

The main objective of the invention is to provide an assembled container having an enhanced combining strength between a body and an upper collar of the container.

The assembled container has a body and an upper collar. The body has an open top, an annular lip, an annular wall and multiple combining blocks. The annular lip is formed around the open top of the body and has a top surface. The annular wall is formed on and protrudes from the top surface of the annular lip and has an outer surface and at least one engaging recess defined in the outer surface. The combining blocks are formed on and protrude from the top surface of the annular lip, and each combining block has a top, two side walls, a combining hole and at least one engaging hole. The combining hole is defined in the top of the combining block. The at least one engaging hole is defined respectively through at least one of the side walls and communicates with the combining hole. The upper collar is connected to the open top of the body and has a bottom surface, an annular recess, at least one engaging block and multiple combining inserts. The annular recess is defined in the bottom surface of the upper collar and has a first inner surface. The at least one engaging block is formed on the first inner surface of the annular recess and respectively engages the at least one engaging recess in the annular wall. The combining inserts are formed in the annular recess and are respectively inserted into and combined with the combining holes in the combining blocks. Each combining insert has at least one hook formed on an end of the combining insert and respectively engaging the at least one engaging hole in a corresponding combining block.

Other objects, advantages and novel features of the invention will become more apparent from the following detailed description when taken in conjunction with the accompanying drawings.

DETAILED DESCRIPTION OF PREFERRED EMBODIMENT

Figure 1:
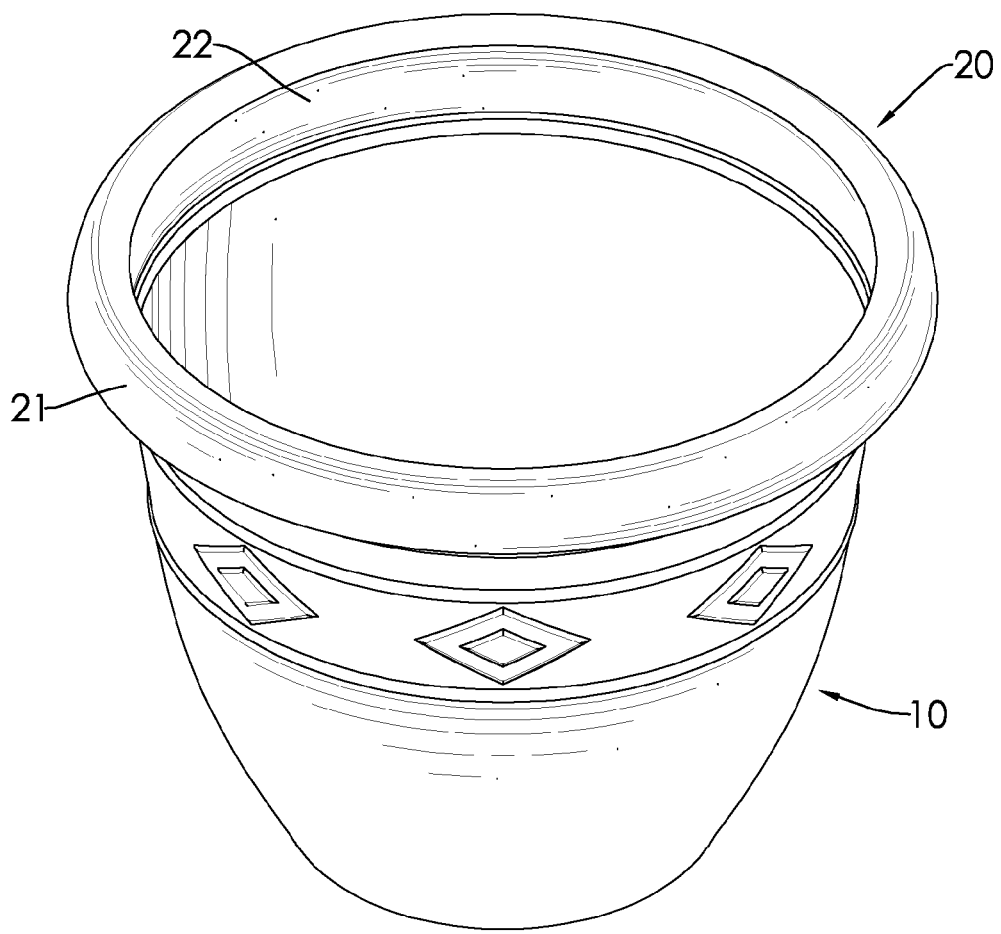
FIG. 1 is a perspective view of an assembled container in accordance with the present invention.

With reference to FIG. 1, an assembled container in accordance with the present invention comprises a body 10 and an upper collar 20.

Figure 2:
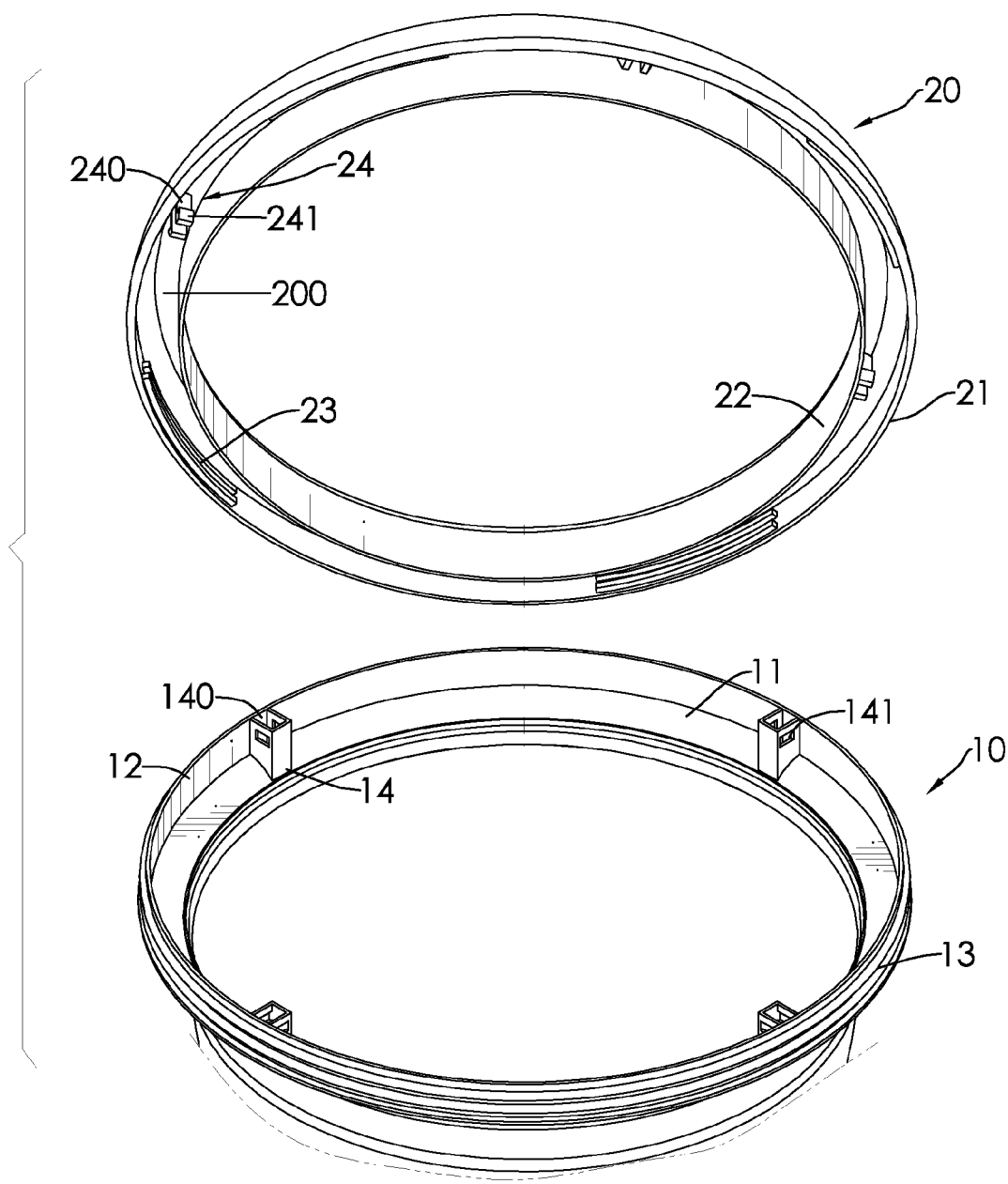
FIG. 2 is a partially exploded perspective view of the assembled container in FIG. 1.
Figure 4:
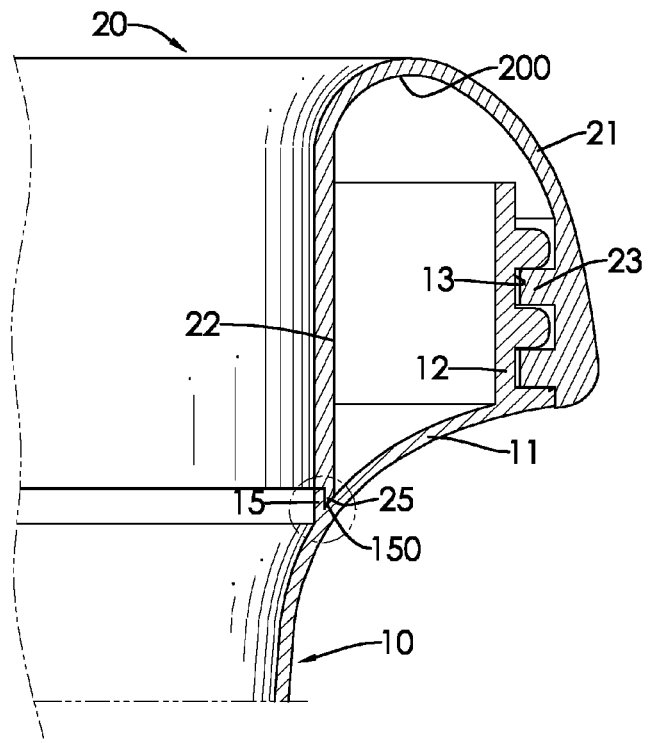
FIG. 4 is an enlarged cross sectional side view of the assembled container in FIG. 1.
Figure 6:
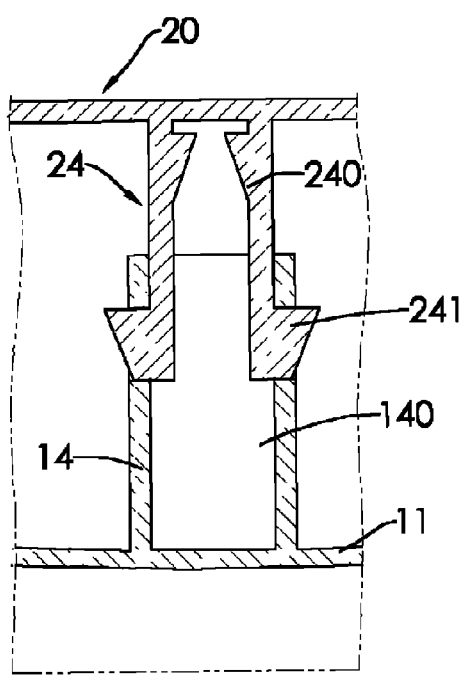
FIG. 6 is an enlarged cross section side view of the assembled container along the line 6-6 in FIG. 3.

With further reference to FIGS. 2 and 4, the body 10 is hollow and has an open top, an annular lip 11, an annular wall 12 and multiple combining blocks 14. The annular lip 11 is formed around and extends outward from the open top of the body 10 and has a top surface. The annular wall 12 is formed on and protrudes from the top surface of the annular lip 11 and has an outer surface and at least one engaging recess 13 defined in the outer surface. Preferably, the body 10 has multiple engaging recesses 13 defined separately in the outer surface of the annular wall 12 at intervals. Alternatively, the body 10 may have a single engaging recess 13 defined annularly around the outer surface of the annular wall 12. With further reference to FIG. 6, the combining blocks 14 are formed on and protrude from the top surface of the annular lip 11 at even intervals and may be U-shaped in cross section. Each combining block 14 is connected to the annular wall 12 and has a top, two side walls, a combining hole 140 and at least one engaging hole 141. The combining hole 140 is defined in the top of the combining block 14. The at least one engaging hole 141 is defined respectively through at least one of the side walls and communicates with the combining hole 140. Preferably, each combining block 14 has two engaging holes 141 defined respectively through the side walls of the combining block 140.

Figure 3:
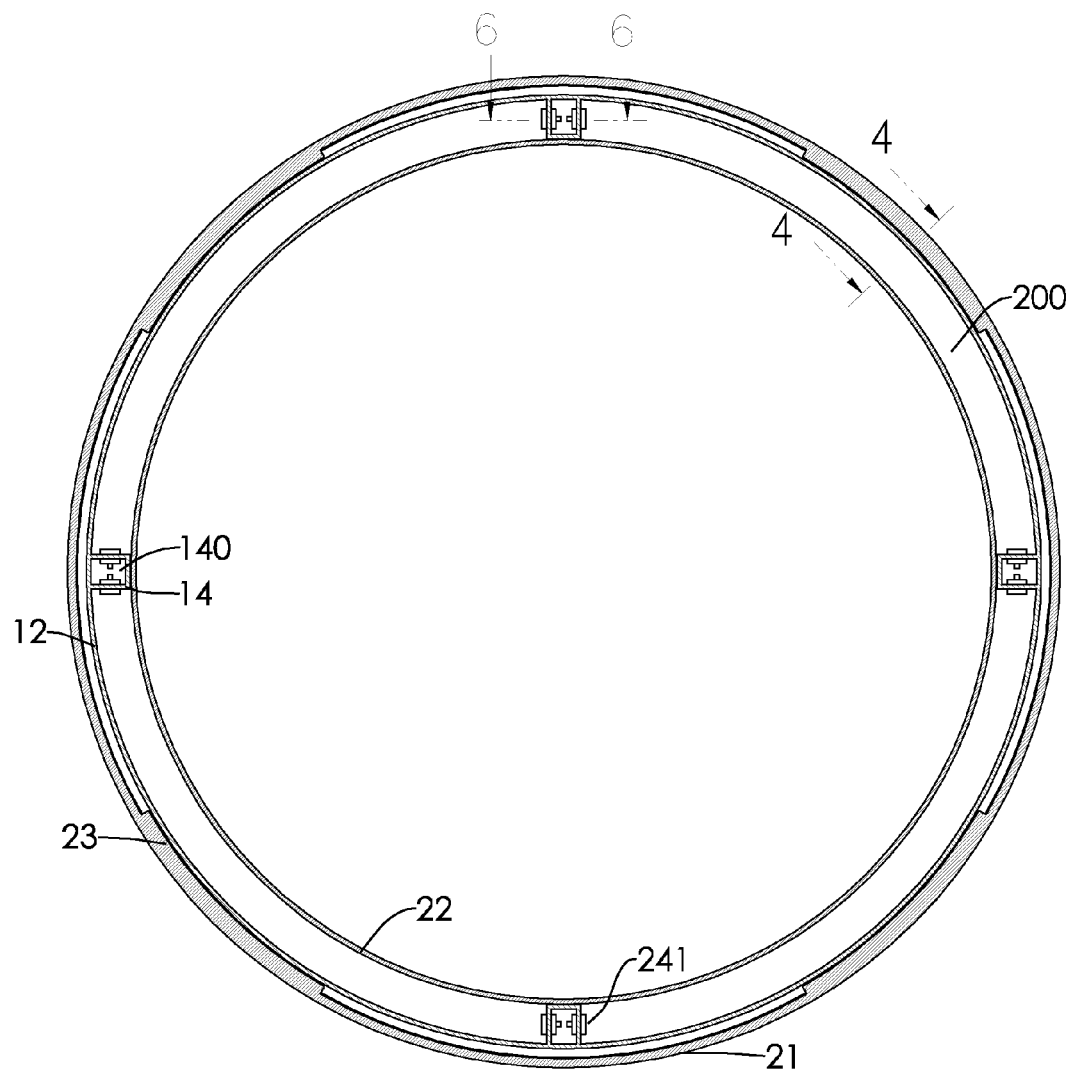
FIG. 3 is an enlarged top view in partial section of the assembled container in FIG. 1.
Figure 7:
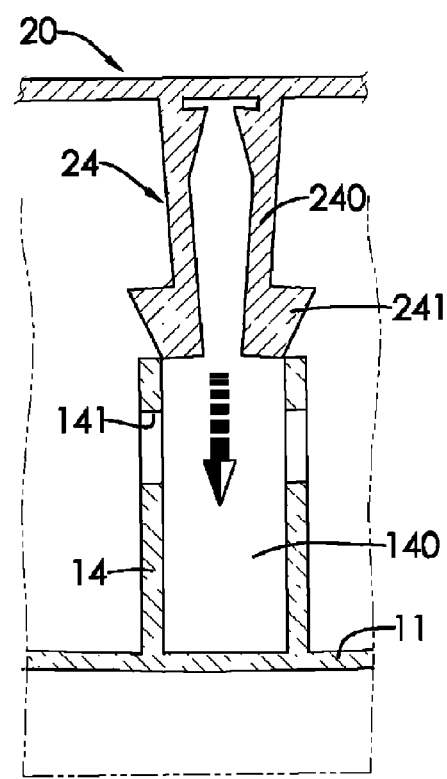
FIG. 7 is an operational cross side view of the assembly container in FIG. 6.
Figure 8:
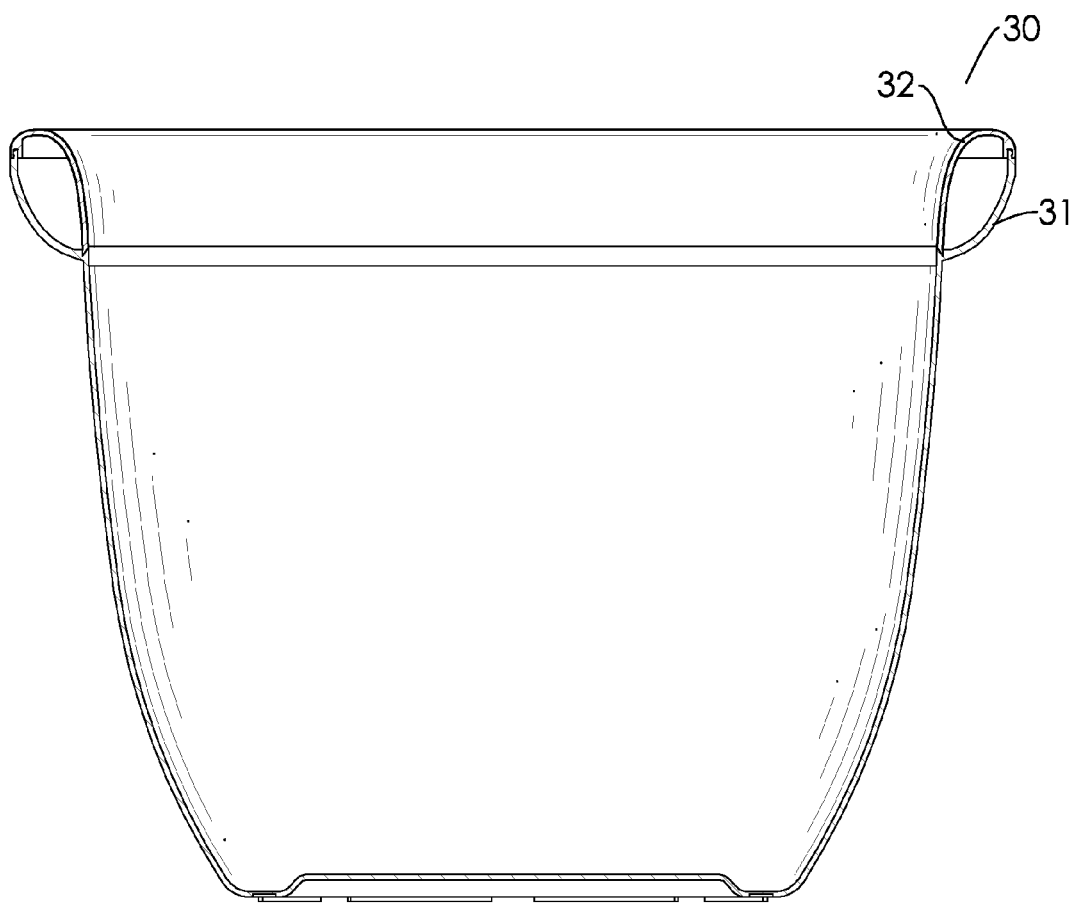
FIG. 8 is a cross sectional side view of a conventional flowerpot in accordance with the prior art.
Figure 9:
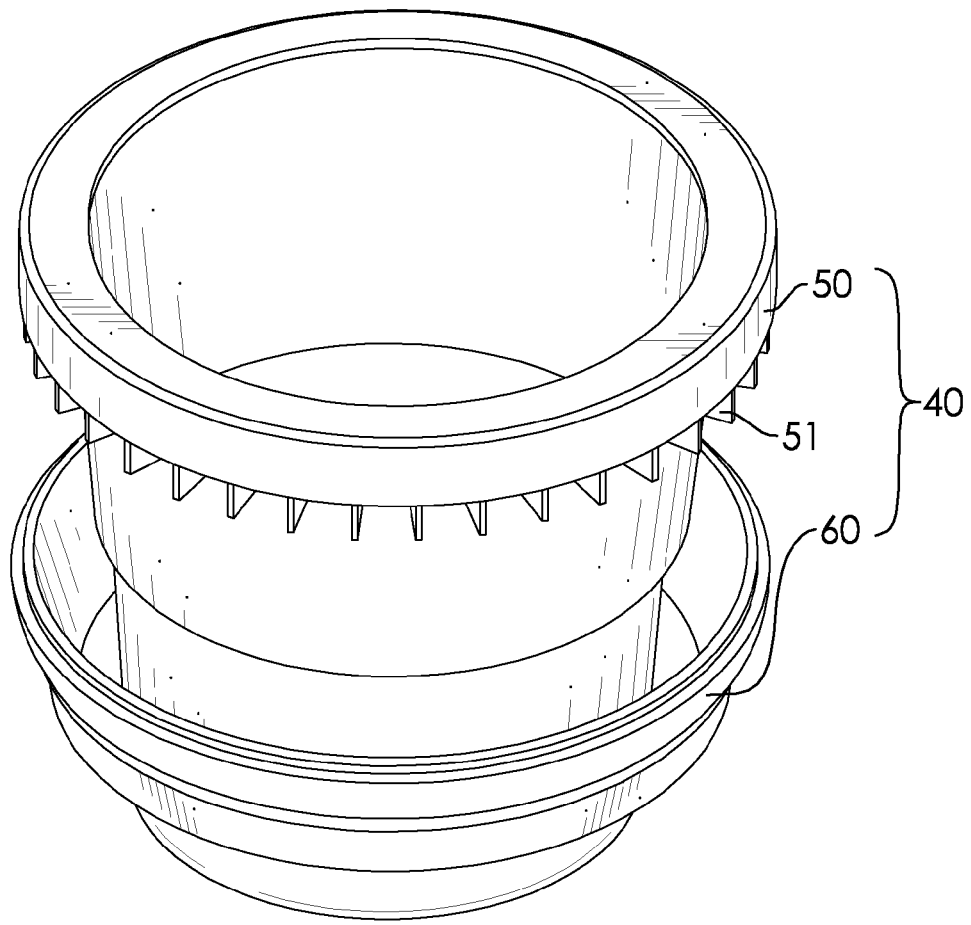
FIG. 9 is an exploded perspective view of another conventional flowerpot in accordance with the prior art.
Figure 10:
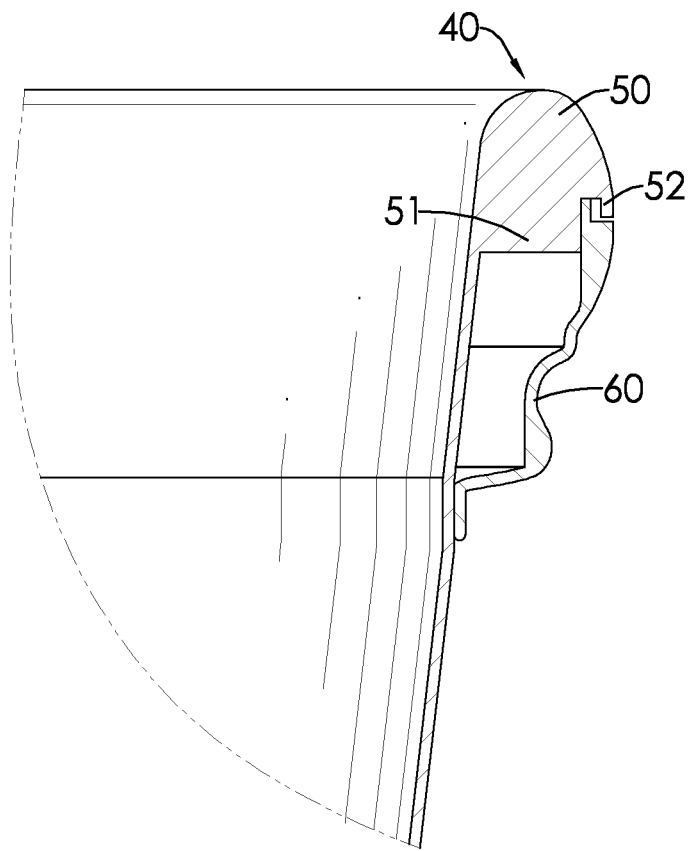
FIG. 10 is an enlarged cross sectional side view of the conventional flowerpot in FIG. 9.

With reference to FIGS. 2 and 3, the upper collar 20 is connected to the open top of the body 10 and has an inner wall 22, an outer wall 21, a bottom surface, an annular recess 200, at least one engaging block 23 and multiple combining inserts 24. The annular recess 200 is defined in the bottom surface between the inner wall 22 and outer wall 21 of the upper collar 20 and has a first inner surface corresponding to the outer wall 21 of the upper collar 20. The at least one engaging block 23 is formed on the first inner surface of the annular recess 200 and respectively engages the at least one engaging recess 13 in the annular wall 12. Preferably, the upper collar 20 has multiple engaging blocks 23 formed separately on the first inner surface of the annular recess 200 or a single engaging block 23 formed annularly around the first inner surface of the annular recess 200. The combining inserts 24 are formed on and protrude from an inner top of the annular recess 200 and respectively inserted into and combined with the combining holes 140 in the combining blocks 14. Each combining insert 24 has at least one hook 241 formed on an end of the combining insert 24 and respectively engaging the at least one engaging hole 141 in a corresponding combining block 14. With reference to FIGS. 2, 6 and 7, each combining insert 24 has two resilient inserting wings 240 mounted in the combining hole 140 in the corresponding combining block 14 and being separate from each other to define a gap between the inserting wings 240. With the arrangement of the gap, the inserting wings 240 have a resilience for being pushed to be close to each other. Each inserting wing 240 has a hook 241 formed on an end of the inserting wing 240 and engaging one of the engaging holes 141 in the corresponding combining block 14. The numbers of the combining blocks 14 on the body 10 and the combining inserts 24 on the upper collar 20 may be varied based on the shapes and sizes of the container to fit with different use needs.

Figure 5:
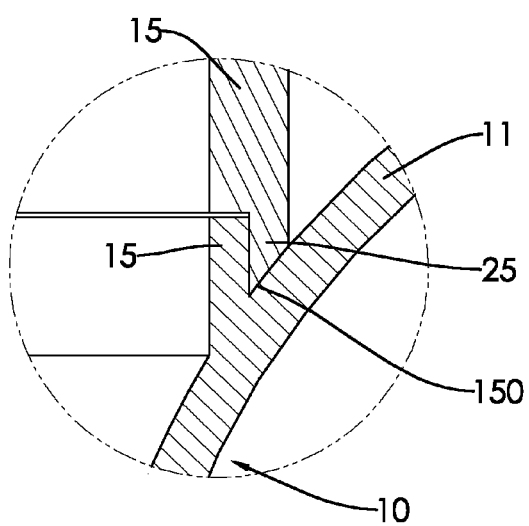
FIG. 5 is an enlarged cross section side view of the assembled container in FIG. 4.

In addition, with reference to FIGS. 4 and 5, the annular lip 11 further has at least one curved rib 15 formed on and protruding from the top surface of the annular lip 11 at a position adjacent to the open top of the body 10 to define a combining notch 150 between each curved rib 15 and the top surface of the annular lip 11. The upper collar 20 further has at least one mounting rib 25 formed on and protruding from the bottom surface of the upper collar 20, and each mounting rib 25 has an inclined end engaging the combining notch 150 defined between one of the at least one curved rib 15 and the top surface of the annular lip 11.

When the upper collar 20 is attached to the open top of the body 10, the engaging blocks 23 on the upper collar 20 will engage the engaging recess 13 in the annular wall 12, and the mounting ribs 25 will be inserted into and engage the combining notches 150 in the body 10 so as to form an annular space between the upper collar 20 and the body 10 due to the annular recess 200. Accordingly, a sufficient structural strength is provided for bear a heavy load and material for forming the upper collar 20 can be reduced due to the hollow annular space between the collar 20 and the body 10. Because the body 10 and the upper collar 20 can be separately formed and be combined with each other easily, the cost for manufacturing the container in accordance with the present invention can be effectively reduced.

In addition, when the upper collar 20 is attached to the open top of the body 10, the combining inserts 24 on the upper collar 20 will be inserted respectively into the combining holes 140 in the combining blocks 140 on the body 10. The inserting wings 240 of the combining inserts 24 can be compressed toward each other, and hooks 241 on the combining inserts 24 will engage and hook on the engaging holes 141 in the combining blocks 14. With the engagement between the hooks 241 on the combining inserts 24 and the engaging holes 141 in the combining blocks 14, the upper collar 20 can be securely attached to the open top of the body 10 with an enhanced combining strength. Furthermore, the upper collar 20 can be kept from rotating relative to and being detached from the body 10. If soil is put into the body 10, the container can serve as a flowerpot to grow plants in the container to enable the plants to grow up and to extend upward from the open top of the body 10. With the enhanced combining structural strength between the body 10 and the upper collar 20, the container can be moved or transported to any desired location with a user holding the upper collar 20 with hands.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. An assembled container comprising:
a body having
  an open top;
  an annular lip formed around the open top of the body and having a top surface;
  an annular wall formed on and protruding from the top surface of the annular lip and having an outer surface and at least one engaging recess defined in the outer surface; and
  multiple combining blocks formed on and protruding from the top surface of the annular lip, and each combining block having
    a top;
    two side walls;
    a combining hole defined in the top of the combining block; and
    at least one engaging hole defined respectively through at least one of the side walls and communicating with the combining hole; and
an upper collar connected to the open top of the body and having
  a bottom surface;
  an annular recess defined in the bottom surface of the upper collar and having a first inner surface;
  at least one engaging block formed on the first inner surface of the annular recess and respectively engaging the at least one engaging recess in the annular wall; and
  multiple combining inserts formed in the annular recess and respectively inserted into and combined with the combining holes in the combining blocks, and each combining insert having at least one hook formed on an end of the combining insert and respectively engaging the at least one engaging hole in a corresponding combining block.

2. The assembled container as claimed in claim 1, wherein
each combining block has two engaging holes defined respectively through the side walls of the combining block; and
each combining insert has two resilient inserting wings mounted in the combining hole in the corresponding combining block and being separate from each other to define a gap between the inserting wings, and
each inserting wing has a hook formed on an end of the inserting wing and engaging one of the engaging holes in the corresponding combining block.

3. The assembled container as claimed in claim 2, wherein
the annular lip has at least one curved rib formed on and protruding from the top surface of the annular lip at a position adjacent to the open top of the body to define a combining notch between each one of the at least one curved rib and the top surface of the annular lip; and
the upper collar further has at least one mounting rib formed on and protruding from the bottom surface of the upper collar, and each one of the at least one mounting rib having an inclined end engaging the combining notch defined between one of the at least one curved rib and the top surface of the annular lip.

4. The assembled container as claimed in claim 1, wherein
the body has multiple engaging recesses defined separately in the outer surface of the annular wall at intervals; and
the upper collar has multiple engaging blocks formed separately on the first inner surface of the annular recess and respectively engaging the engaging recesses in the body.

5. The assembled container as claimed in claim 4, wherein
each combining block has two engaging holes defined respectively through the side walls of the combining block; and
each combining insert has two resilient inserting wings mounted in the combining hole in the corresponding combining block and being separate from each other to define a gap between the inserting wings, and
each inserting wing has a hook formed on an end of the inserting wing and engaging one of the engaging holes in the corresponding combining block.

6. The assembled container as claimed in claim 5, wherein
the annular lip has at least one curved rib formed on and protruding from the top surface of the annular lip at a position adjacent to the open top of the body to define a combining notch between each one of the at least one curved rib and the top surface of the annular lip; and
the upper collar further has at least one mounting rib formed on and protruding from the bottom surface of the upper collar, and each one of the at least one mounting rib having an inclined end engaging the combining notch defined between one of the at least one curved rib and the top surface of the annular lip.

7. The assembled container as claimed in claim 1, wherein
the body has a single engaging recess defined annularly around the outer surface of the annular wall; and
the upper collar has a single engaging block formed annularly around the first inner surface of the annular recess and engaging the engaging recess in the body.

8. The assembled container as claimed in claim 7, wherein
each combining block has two engaging holes defined respectively through the side walls of the combining block; and
each combining insert has two resilient inserting wings mounted in the combining hole in the corresponding combining block and being separate from each other to define a gap between the inserting wings, and
each inserting wing has a hook formed on an end of the inserting wing and engaging one of the engaging holes in the corresponding combining block.

9. The assembled container as claimed in claim 8, wherein
the annular lip has at least one curved rib formed on and protruding from the top surface of the annular lip at a position adjacent to the open top of the body to define a combining notch between each one of the at least one curved rib and the top surface of the annular lip; and
the upper collar further has at least one mounting rib formed on and protruding from the bottom surface of the upper collar, and each one of the at least one mounting rib having an inclined end engaging the combining notch defined between one of the at least one curved rib and the top surface of the annular lip.

* * * * *